(12) United States Patent
Wei et al.

(10) Patent No.: US 8,138,369 B2
(45) Date of Patent: *Mar. 20, 2012

(54) REMOVAL OF BRANCHED DIBENZOTHIOPHENES FROM HYDROCARBON MIXTURES VIA CHARGE TRANSFER COMPLEXES WITH A TAPA-FUNCTIONALIZED ADSORBENT

(75) Inventors: Xiaolin Wei, Beijing (CN); Scott Michael Husson, Greenville, SC (US); Marcus V. Dutra e Mello, Moraga, CA (US); Daniel Chinn, Bay Point, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 957 days.

This patent is subject to a terminal disclaimer.

(21) Appl. No.: 12/134,311

(22) Filed: Jun. 6, 2008

(65) Prior Publication Data
US 2009/0076221 A1    Mar. 19, 2009

Related U.S. Application Data

(60) Provisional application No. 60/942,592, filed on Jun. 7, 2007.

(51) Int. Cl.
*C08K 9/06*  (2006.01)

(52) U.S. Cl. .......... 560/21; 428/407; 525/102; 562/435; 208/236; 208/237; 208/240; 208/245; 523/200; 523/205; 523/206; 523/212; 523/213; 523/216; 523/209; 526/194; 526/319; 526/332; 526/333; 585/820; 585/826; 585/827

(58) Field of Classification Search .................. 428/407; 523/200, 205, 206, 209, 212, 213, 216; 526/194, 526/319, 332, 333
See application file for complete search history.

(56) References Cited

U.S. PATENT DOCUMENTS 4,699,717 A * 10/1987 Riesner et al. ............... 536/25.4
6,407,187 B1 * 6/2002 Matyjaszewski et al. ...... 526/89

FOREIGN PATENT DOCUMENTS
DE         2632443        *  1/1978

OTHER PUBLICATIONS

Milenkovic, Energy and Fuels, 1999, 13, 881-887.*
Wei, Ind. Eng. Chem. Res. 2007, 46, 2117-2124.*

* cited by examiner

*Primary Examiner* — Vasu Jagannathan
*Assistant Examiner* — Robert C Boyle

(57) ABSTRACT

A process for producing an adsorbent where a metal oxide is reacted with an alkoxy silane to produce an epoxy-functionalized metal oxide. This product is reacted with an amino-substituted propionic acid and a nitro-substituted fluorenone, and this product is grafted to the epoxy-functionalized metal oxide. This grafted product is the adsorbent, which may be contacted with a hydrocarbon mixture having at least one sulfur containing compound in order to remove this sulfur containing compound. Also disclosed is a process for adding polymerization groups to an adsorbent.

21 Claims, 10 Drawing Sheets

REMOVAL OF BRANCHED DIBENZOTHIOPHENES FROM HYDROCARBON MIXTURES VIA CHARGE TRANSFER COMPLEXES WITH A TAPA-FUNCTIONALIZED ADSORBENT

CROSS REFERENCE TO RELATED APPLICATIONS

This non-provisional patent application claims the benefit of provisional patent application No. 60/942,592, filed on Jun. 7, 2007.

FIELD OF THE INVENTION

The present invention is related to processes for removing dibenzothiophenes from hydrocarbon mixtures by functionalizing metal oxides to create sorbents that bind dibenzothiophenes via reversible charge transfer complexes.

BACKGROUND OF THE INVENTION

The removal of sulfur from gasoline fuel demands attention worldwide, not only because of the need to reduce atmospheric pollution by sulfur oxides, but also because of the need to make ultra-low sulfur fuels for hydrocarbon fuel processors used in fuel cell applications. EPA regulations put forward in 2001 require that gasoline sulfur content must be $\leq$30 ppmw, and highway diesel sulfur content should be $\leq$15 ppmw in 2009.

The common types of sulfur compounds in various distillate fuel fractions include sulfides, disulfides, thiols, thiophenes, benzothiophenes, methyl-benzothiophenes, dibenzothiophenes, and methyl-substituted dibenzothiophenes. The presence of sulfur compounds in commercial fuels is highly undesirable. These compounds are corrosive to metals, poison catalysts in hydrocarbon fuel processors, and they contaminate the environment in the form of sulfur oxides emitted in engine exhaust.

Currently, the extent of petroleum feedstock desulfurization depends on the catalytic hydrodesulfurization process (HDS), where the sulfur compounds lose sulfur by hydrogenation reactions, giving off $H_2S$ as one of the treatable products. Hydrotreating is a commercially proven and simple refining process, and refineries with hydrotreaters produce deeply desulfurized gas oil on straight-run distillates by modifying catalysts and operating conditions. However, greater challenges are expected for desulfurizing distillate streams such as Light Cycle Oil (LCO), requiring either substantial revamps to equipment or construction of new units. Specifically, hydrotreating LCO requires a higher reactor pressure, as well as an increased hydrogen rate and purity. Furthermore, distillates from Fluid Catalytic Cracking (FCC) operations contain higher concentrations of compounds with aromatic rings, which make deep desulfurization more difficult. For these reasons, new technology developments are needed for the ultra-deep desulfurization of these feedstocks.

In order to reduce the cost of deep-desulfurization, several new technologies have been introduced in the experimental stages. Among them, sulfur adsorption, sulfur oxidation and biodesulfurization seem to be quite promising. The major advantages of these new technologies include lower costs, lower processing temperatures and pressures reduced emissions of gaseous pollutants and carbon dioxide, and no hydrogen requirement. In general, the sulfur adsorption processes use specific sorbents that interact with the sulfur-containing compounds to separate them selectively from the hydrocarbon mixtures. This technology seems particularly favorable for gasoline desulfurization because the process does not modify the hydrocarbon components, thereby avoiding any loss in octane rating.

In commercial gasoline, the major sulfur compounds are thiophene, benzothiophene, dibenzothiophene, and their alkyl derivatives. This fact indicates that the reactivities of alkyl-substituted benzothiophenes (BT) and dibenzothiophenes (DBT) are much lower during catalytic hydrotreating than those of other sulfur-containing molecules. Kabe et al. reported that although the alkyl group substitutions of DBT do not inhibit the adsorption of DBTs on catalysts via π-electrons in the aromatic rings, the C—S bond cleavage of adsorbed DBTs is disturbed by steric hinderance of the alkyl group(s). Kabe, T.; Ishihara, A.; Zhang, Q. Deep desulfurization of light oil. Part 2: hydrodesulfurization of dibenzothiophene, 4-methyldibenzothiophene and 4,6-dimethyldibenzothiophene. Appl. Catal. A 1993, 97, L1-L9. Consequently, in the ultra-deep desulfurization process, the removal of these substituted DBTs is of greatest interest for refineries.

Because DBTs are electron rich, they form charge transfer complexes (CTCs) with suitable electron acceptors. For this reason, reversible complexation of DBTs by π-acceptors can be used as a separation strategy to recover DBTs. One technical challenge to overcome in order to use reversible complexation as the strategy for DBT removal from gasoils is that gasoils contain numerous other aromatic compounds that also can donate electrons to form CTCs with the acceptor compound. For this reason, the acceptor compound (or, more generally, the separation agent) needs to be selective toward the DBTs. To tackle this critical need, we have prepared and tested a new sorbent that incorporates π-acceptor groups known to be efficient and selective for binding DBTs.

SUMMARY OF THE INVENTION

One aspect of this invention is directed to a process for producing an adsorbent. In this process a metal oxide is reacted with an alkoxy silane to produce ah epoxy-functionalized metal oxide. This product is reacted with an amino-substituted propionic acid and a nitro-substituted fluorenone, and this product is grafted to the epoxy-functionalized metal oxide. This grafted product is the adsorbent, which may be contacted with a hydrocarbon mixture haying at least one sulfur containing compound in order to remove this sulfur containing compound.

Another aspect of the invention is directed to a process for adding polymerization groups to an adsorbent. In this process a metal oxide is reacted with an alkoxy silane to produce an epoxy-functionalized metal oxide. This product is reacted with an amino-substituted propionic acid and a nitro-substituted fluorenone, and this product is grafted to the epoxy-functionalized metal oxide. This grafted product is the adsorbent, which is reacted with a bromo-substituted propionic acid and then ethylene glycol dimethacrylate is graft polymerized onto the adsorbent. This grafted product may be contacted with a hydrocarbon mixture having at least one sulfur containing compound in order to remove this sulfur containing compound.

DETAILED DESCRIPTION OF THE INVENTION

Figure 1:
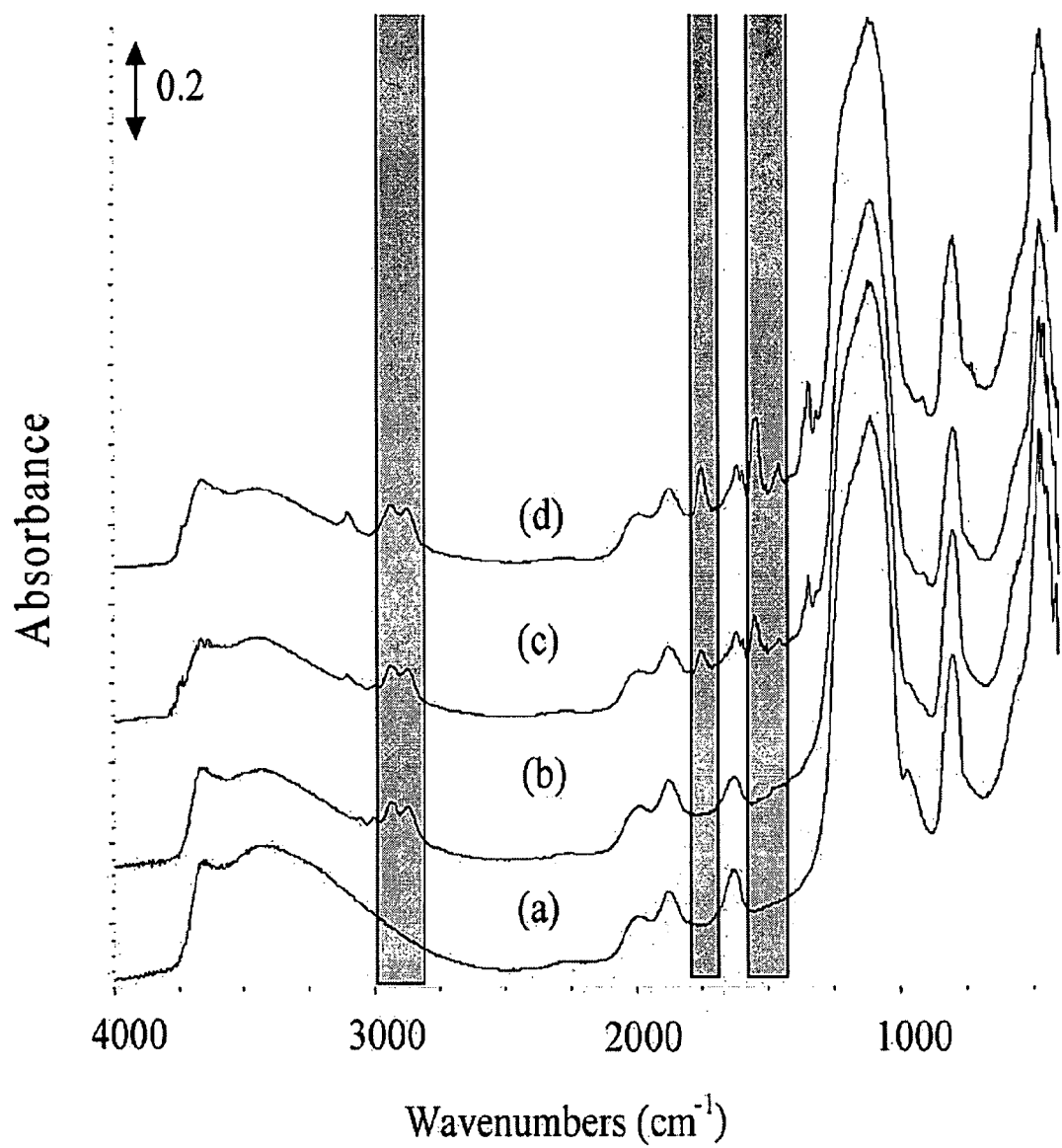
FIG. 1 depicts a DRIFTS spectra of (a) bare silica(I), (b) epoxy-functionalized silica(I); (c) TAPA-functionalized silica(I) (reaction for 4 h), (d) TAPA-functionalized silica(I) (reaction for 22 h).

In this invention, porous silica gel is functionalized with 2,4,5,7-tetranitro-9-fluorenone to create a sorbent that binds DBTs via reversible charge transfer complexation. Electron acceptors of the fluorenone series are of considerable interest in the study of CTCs. They have semiconducting and photoconducting properties, and serve as electron transport materials. Nitro-group derivatives of 9-fluorenone and 9-dicyanomethylenefluorenone are among the best known electron acceptors. In this invention, 2,4,5)-7-tetranitrofluorenone was covalently tethered to a silica gel support material and 4,6-dimethyldibenzothiophene (4,6-DMDBT) was selected as the target adsorptive to test this newly developed sorbent. Following synthesis and characterization of the new sorbent, batch adsorption studies were carried out to measure the binding capacities of the sorbent for 4,6-DMDBT and to determine the enthalpy change on adsorption.

EXAMPLES

All chemicals were used as received, except otherwise where noted. Percentages herein refer to wt. %. 2,4,5,7-Tetranitrofluorenone (TeNF, 97%) was purchased from Pfaltz & Bauer. 2-(isopropylideneaminooxy)propionic acid (PPA, 97%) was purchased from Lancaster Synthesis, Inc. 3-glycidyloxypropyl trimethoxysilane (3-GPTMS, 98%), glacial acetic acid (99.99%), toluene (anhydrous, 99.8%), sulfuric acid (95%-98%), tetrabutylammonium bromide (TBAB, 99%), and 4,6-dimethyldibenzothiophene (4,6-DMDBT, 97%) were purchased from Sigma Aldrich.

Two types of silica gel were used; they are denoted as types I and II. Silica(I) was purchased from Sigma Aldrich; it has a particle size range from 37 to 75 μm, an average inner pore diameter of 60 Å, and surface area of 480 m$^2$/g. Silica(II) was provided by Grace GmbH & Co. KG (Worms, Germany), having the following characteristics: irregular particle shape, average particle size of 20 nm, average pore size of 1000 Å, surface area of 40 m$^2$/g, and a pore volume of 1.05 mL/g.

While the processes and products disclosed herein are described with respect to silica, it should be understood that the metal oxide employed need not be silica. Other metal oxides may used; including, but not limited to alumina and zeolites (in particular, silicate and aluminosilicate zeolites).

Silanization Reaction

For silanization, 1.89 g (8 mmol) of 3-GPTMS was added to a suspension comprising 12.0 g of silica(I) in 120 mL of anhydrous toluene, and the suspension was stirred and refluxed at 110° C. for 24 h. The epoxy-functionalized silica (I) was filtered, washed with 200 mL of toluene and 200 mL of ethanol and dried at 80° C. overnight under vacuum at 25 mmHg. The same procedure was used to functionalize silica (II), but, in this case, 3.87 g (16 mmol) of 3-GPTMS was used to account for the much higher surface area available for reaction. In both cases, the molar amount of 3-GPTMS in solution was in large excess relative to the estimated number of surface silanol groups (vida infra).

Synthesis of
2,4,5,7-Tetranitro-9-fluorenylideneaminooxy
Propionic Acid (TAPA)

Scheme 1 shows the synthesis reaction of 2,4,5,7-tetranitro-9-fluorenylideneaminooxy propionic acid (TAPA).

Scheme 1.

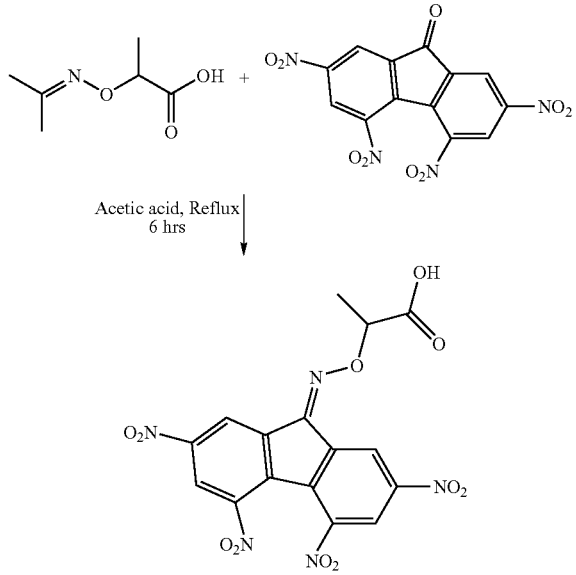

4 g (0.028 mmol) of PPA was added to 65 mL of glacial acetic acid in a 250 mL round-bottom flask. To this solution were added 6.55 g (0.018 mmol) of TeNF, 0.22-0.25 mL of concentrated sulfuric acid, and a few boiling chips. The suspension was heated under reflux. After 2.5, 3 and 4 hours of refluxing, additions were made of 0.8, 0.5 and 0.5 mL of water, respectively. After 6 hours, the reaction mixture was diluted while hot with 8 mL of room temperature water, and crystallization was allowed to take place slowly, first at room temperature for 4 hours and then at 0°G for 2 days. The yellow crystalline TAPA product was filtered with filter paper (particle retention for $d_p > 2.7$ μm) and dissolved in 50 mL of hot acetic acid at 110° C. The solution was diluted while hot with 40 mL of room temperature water, cooled rapidly in an ice bath with stirring, and kept at 0° C. overnight. Following this second crystallization step, the purified TAPA was filtered and air-dried away from direct sunlight until the odor of acetic acid was negligible. The yellow crystals were then dried in an oven at 110° C. to yield 6.3 g of TAPA (yield of 79%). $^1$H NMR (300 MHz; toluene-$d_8$) δ=9.0 (1H), 8.29 (1H), 8.19 (1H), 8.15 (1H), 4.74 (2H), 1.47 (2H).

Grafting TAPA to the Silica Surface a. Direct (One-step) Grafting Method

Scheme 2 below illustrates the procedure to directly graft TAPA to the silica surface Scheme 2

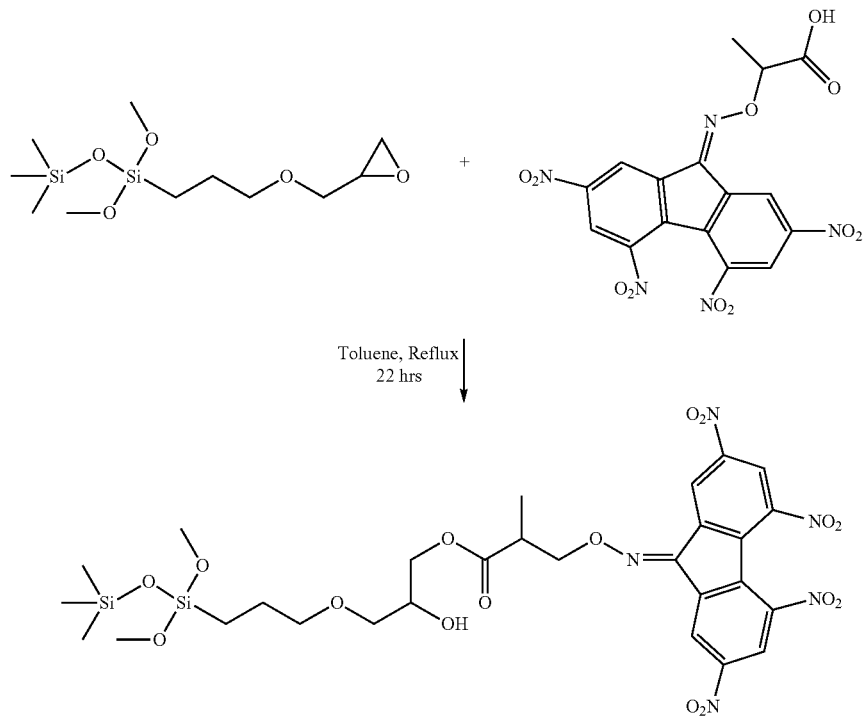

0.89 g (2 mmol) of TAPA was added to a suspension comprising 6 g of epoxy-functionalized silica(I) in 120 mL of anhydrous toluene. Next, 16 mg (0.05 mmol) of TBAB was added to the suspension as a catalyst. The suspension was stirred and refluxed at 110° C. for 22 h. The TAPA-functionalized silica(I) was filtered, washed with 200 mL of toluene, and then dried at 80° C. overnight under vacuum at 25 mmHg. The same procedure was used to graft TAPA from silica(II) by changing the mass of silica(II) to 1 g, the mass of TBAB to 32 mg, and the volume of anhydrous toluene to 60 mL.

b. Two-step Grafting Method

Scheme 3 shows the two-step method to graft TeNF to the silica surface.

Scheme 3

Step 1:

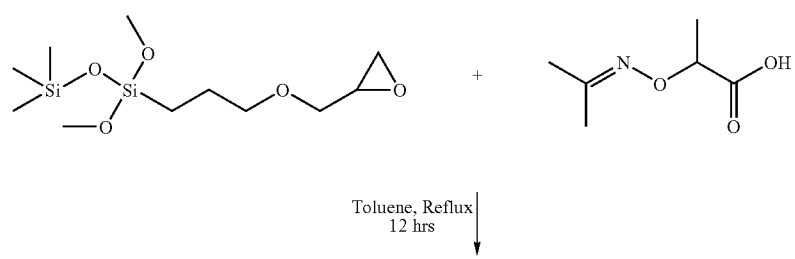

Step 2:

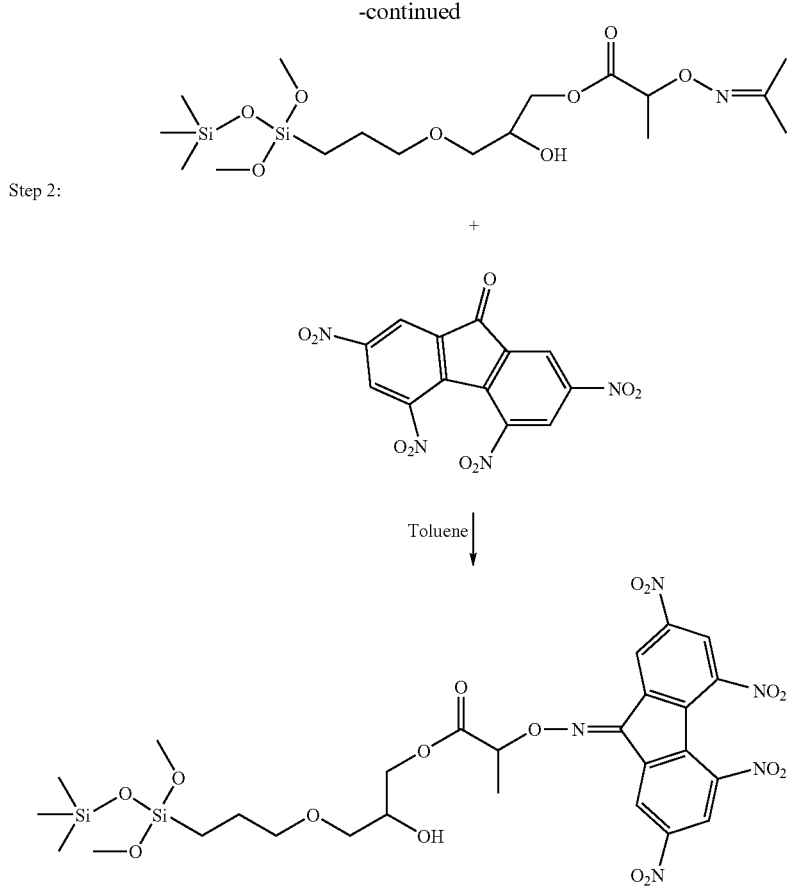

0.435 g (3 mmol) of PPA was added to a suspension comprising 6 g of epoxy-functionalized silica(I) in 120 mL of anhydrous toluene. Next, 16 mg (0.05 mmol) of TBAB was added to the suspension as a catalyst. The suspension was stirred and refluxed at 110° C. for 12 h. The PPA-functionalized silica(I) was filtered, washed with 200 mL of toluene, and dried at 80° C. under vacuum at 25 mmHg. In a second step, 1.08 g (3 mmol) of TeNF and 0.03 mL of concentrated sulfuric acid were added to a suspension comprising 9 g of PPA-grafted silica(I) in 120 mL of anhydrous toluene. Vigorous heating by an oil bath maintained at 140° C. was required to dissolve TeNF completely in toluene to promote the reaction.

Batch Adsorption Studies

Known masses (typically 0.2 to 0.6 g) of bare silica or TAPA-functionalized silica particles were contacted with known volumes (typically 15 mL) of 4,6-DMDBT solutions in n-heptane with initial 4,6-DMDBT concentrations ranging from 0.3 to 3.0 mg/g. The samples were placed in a constant-temperature, reciprocating shaker bath at 175 rpm for 24 h. Adsorption kinetics were studied initially in order to find the time required to reach equilibrium under these gentle agitation conditions. The initial and final 4,6-DMDBT concentrations were determined by gas chromatography (GC), and measurements were done using the same GC conditions that were used to develop the calibration curve.

Analytical Methods a. Gas Chromatography

The GC instrument (GC 6890) was from Hewlett Packard; it used an on-column injection with a 25 m×0.3 mm fused silica capillary column coated with DB 5 ((5%-phenyl)-methylpolysiloxane, J & W Scientific) and coupled to an flame ionization detector (FID) by a heater transfer line. The analysis temperature program was this: Start analysis at 100° C. for 1 min; ramp to 150° C. at 50°G min$^{-1}$ and hold for 2 min; ramp to 230° C. at 10° C. min$^{-1}$. The temperature of the FID detector was 300° C. The carrier and make-up gas was helium with a flow rate of 2 mL/min. The flow rate of hydrogen and air were 40 and 210 mL/min, respectively. The method of multiple-point internal standard was used for GC measurements (See Grab, R.; Barry E. Modern practice of gas chromatography, 4$^{th}$ ed.; Grob, R.; Kaiser, M., Eds.; Wiley Interscience: New Jersey, 2004; Chapter 8). The calibration curve for 4,6-DMDBT was established by using n-octanol as internal standard at a concentration of 72.5 ng/mL. The internal response factor (IRF) was determined to be 0.828. After GC analysis of test samples with unknown 4,6-DMDBT concentrations, sample 4,6-DMDBT concentrations were calculated using Equation 1.

$$Conc._{DMDBT} = \frac{Conc._{IS} \times Area_{DMDBT} \times IRF_{DMDBT}}{Area_{IS}} \quad \text{(Equation 1)}$$

where IS indicates internal standard.

b. Diffuse-reflectance Fourier-transform Infrared Spectroscopy (DRIFTS)

DRIFTS (Nicolet Avatar 360, FT-IR) was used to characterize the silica following each modification step. Samples were mixed with KBr to have a mass concentration between 5 to 10%, and then the mixtures were ground to small particles with a size of 5 nm or less for characterization.

c. Thermogravimetric Analysis (TGA)

TGA (Hi Res TGA 2950 Thermogravimetric Analyzer, TA Instruments) was also used to characterize the silica following each modification step. Ten milligrams of each sample were used for measurement. TGA measurements were performed at 20° C./min from room temperature up to 900° C. under a blanket of high purity nitrogen.

RESULTS AND DISCUSSION

Two methods have been developed and tested for grafting nitro-fluorenone functional groups onto the base silica surface: a direct grafting method and a two-step grafting method. Both methods used an initial silanization treatment that adds epoxy groups to the silica surface for subsequent coupling reactions.

FIG. 1 shows the DRIFTS spectra of silica samples following each surface modification step for the direct grafting method. Comparison between the infrared spectra of bare silica(I) (1a) and epoxy-functionalized silica(I) (1b) reveals the appearance of C—H vibrations of methylene groups (asymmetric stretching mode at 2920 $cm^{-1}$, and symmetric stretching at 2850 $cm^{-1}$) that support successful grafting of 3-GPTMS to the silica surface. Spectra 1c and 1d show new peaks at 1740 $cm^{-1}$, 1542 $cm^{-1}$ and 1345 $cm^{-1}$, which correspond to carbonyl vibration, and asymmetric and symmetric stretching adsorption of $NO_2$ groups, respectively; these peaks confirm that the TAPA was chemically bonded successfully.

Figure 2:
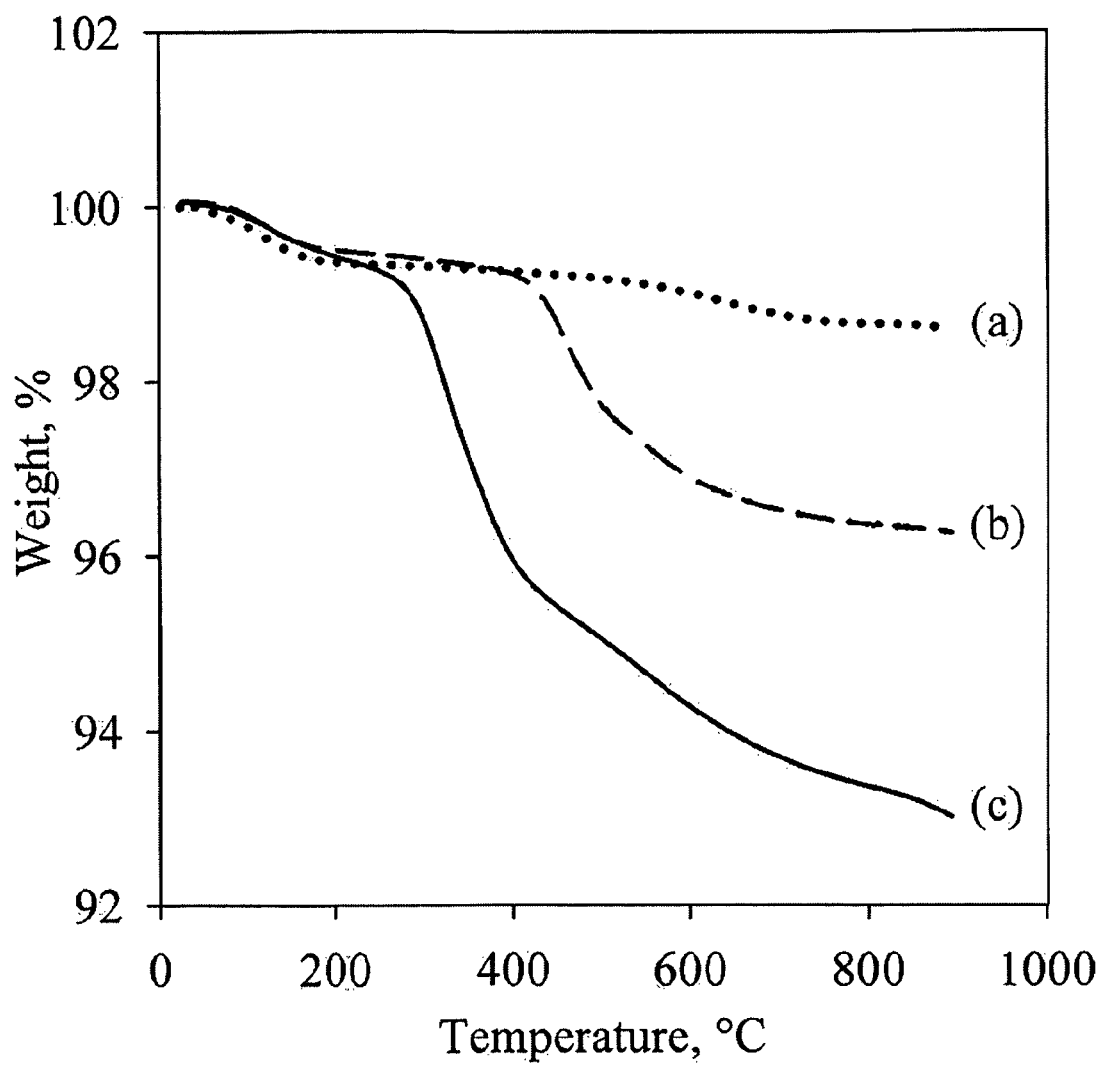
FIG. 2 depicts TGA curves for (a) bare silica(I), (b) epoxy-functionalized silica(I), (c) TAPA-functionalized silica(I) (reaction for 22 h).

FIG. 2 shows the TGA scans of samples following each modification step. For temperatures below 200° C., percentage weight loss was <0.6% for all samples, and the rates of weight loss were the same. This result can be attributed to desorption of physically absorbed water and condensation of any unreacted surface Si—OH groups with one another. The curve for TAPA-functionalized silica(I) shows that TAPA starts to decompose thermally around 300° C. Thus, chemically bonded TAPA possesses strong heat-resistance.

(1) Data from the TGA measurements were used to estimate graft densities for each surface modifier. Table 1 below summarizes these estimated grafted molar amounts. The surface density of OH groups on silica gel is a physicochemical characteristic for a fully hydroxylated surface. Amorphous silica gels prepared by different methods and having different structural characteristics, such as; particle size, specific surface area, size distribution of inner pores, particle packing density, all have similar values of the silanol density within the range 4.2-5.7 OH groups per $\mu m^2$. The current accepted value for most purposes is a mean value of 5.0 OH per $\mu m^2$. The silica gels used in this experiment have surface areas of 40 and 480 $\mu m^2/g$, which means the molar amount of silanol groups are estimated to be 0.332 and 3.98 mmol/g, respectively. The graft amount of 3-GPTMS was 0.154 mmol/g; thus, approximately 46% of silanol groups were functionalized by 3-GPTMS. This result seems reasonable given the findings of Pursch et al., who reported that, during this type of grafting process, the silica surface becomes crowded with alkyl chains; close spacing of alkyl chains is prevented because of steric-hindrance effects (see Pursch, M.; Sander, L. G.; Albert, K. Chain order and mobility of high-density $C_{18}$ phases by solid-state NMR spectroscopy and liquid chromatography. Anal. Chem. 1996, 68, 4107-4113). The graft amount of TAPA was 0.086 mmol/g; thus, 56% of grafted epoxy functional groups were reacted with TAPA.

TABLE 1

Calculation of graft molar amounts for 3-glycidyloxypropyl trimethoxysilane (epoxy) and TAPA on silica(I) based on the thermogravimetric analysis data.

| Sample | % Weight loss <200° C. | % Weight loss at 890° C. | Graft amount (mmol/g) |
|---|---|---|---|
| Epoxy-silica(I) | 0.49% | 3.74% | 0.154 |
| TAPA-silica(I), 22 hr | 0.56% | 6.99% | 0.086 |

The estimated molar amount of silanol groups for silica(I) is 0.332 mmol/g.

Figure 3:
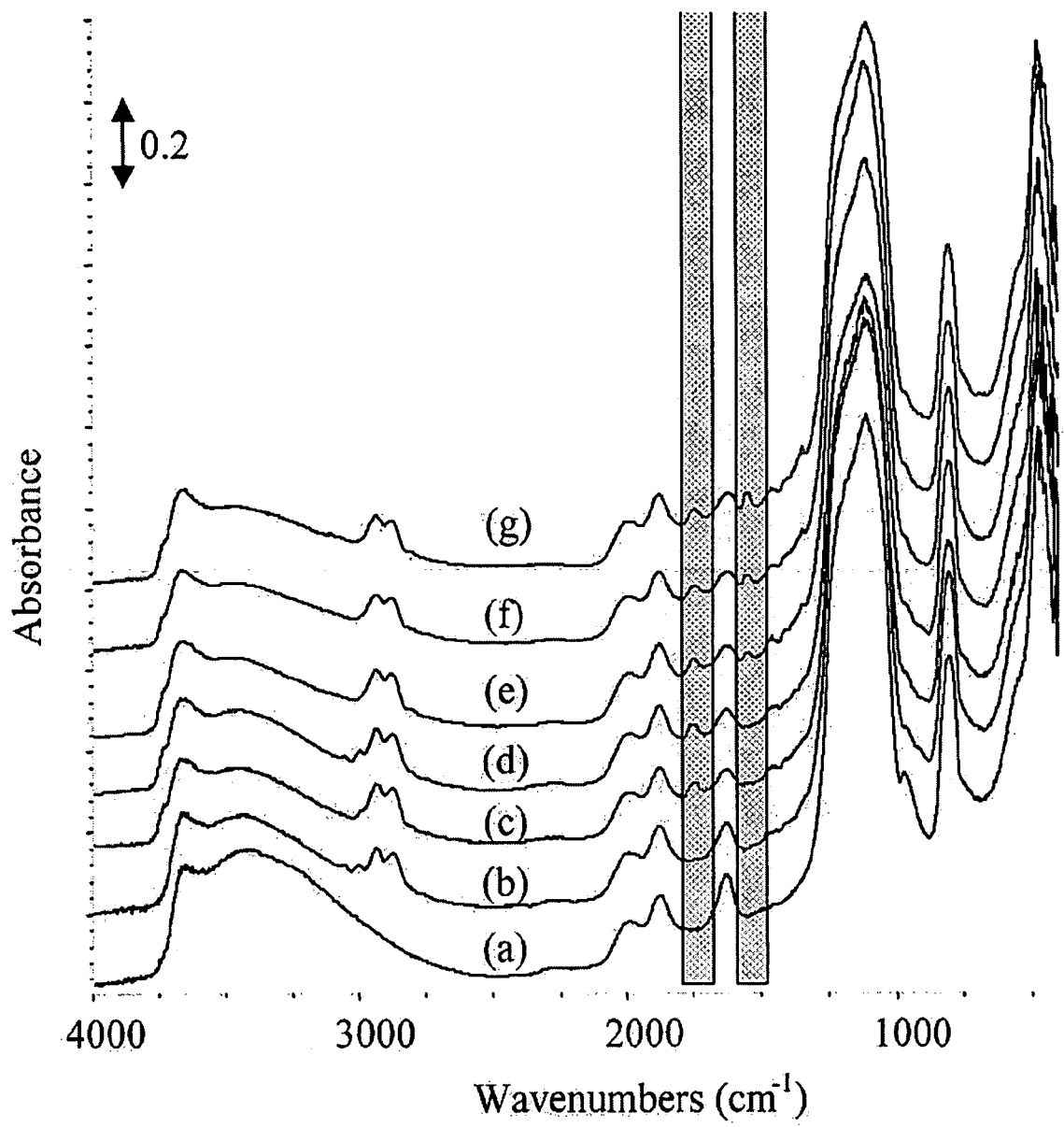
FIG. 3 depicts DRIFTS spectra of (a) bare silica (I), (b) epoxy-grafted silica(I), (c) PA-grafted silica(I) (reaction for 10 h), (d) TENF-grafted silica(I) (reaction for 20 h), (e) TENF-grafted silica (c)(reaction for 46 h), (f) TENF-grafted silica(I) (reaction for 70 h), and (g) TENF-grafted silica(I) (reaction for 94 h).

FIG. 3 shows the DRIFTS spectra used to follow the reactions of the two-step grafting method. A peak at 1740 $cm^{-1}$ in spectrum 3c signifies that the PPA was grafted successfully to epoxy groups on the silica. From spectra 3e-3g, we can conclude from the appearance of $NO_2$ stretching peaks at 1542 $cm^{-1}$ that the TeNF was bonded chemically to PPA sites on the PPA-functionalized silica surface, but the grafting reaction was much slower than that observed for the direct grafting method.

Figure 4:
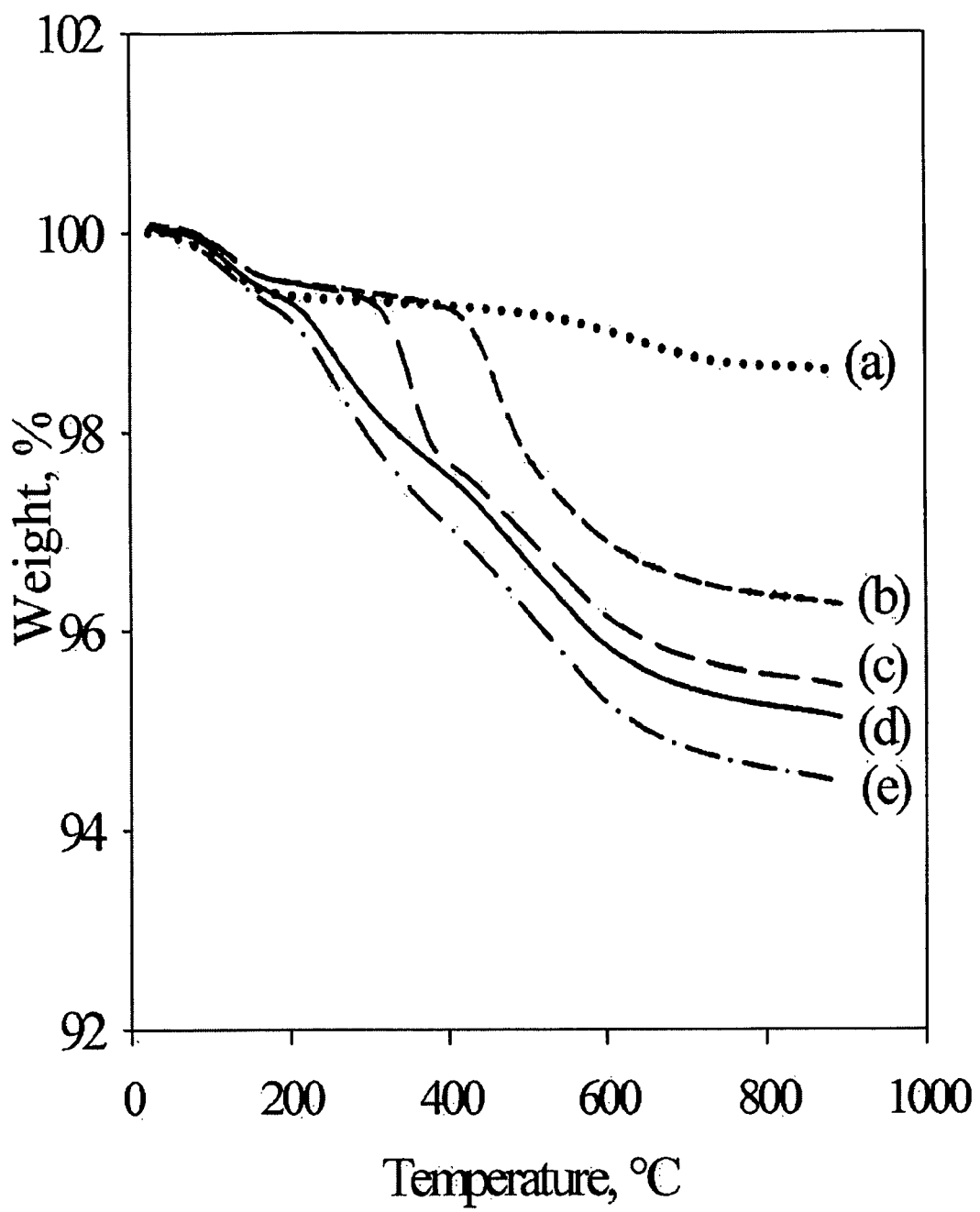
FIG. 4 depicts TGA curves for (a) bare silica(I), (b) epoxy-grafted silica(I), (c) PA-grafted silica(I) (reaction 12 h), (d) TeNF-grafted silica(I) (reaction for 46 h), and (e) TeNF-grafted silica(I) (reaction for 94 h).

FIG. 4 shows the TGA scans of samples following each modification step, and Table 2 summarizes the estimated grafted molar amounts of each modifier. Even after 94 h reaction, the graft amount of TeNF was only 0.014 mmol/g, which is about 20% of that obtained by the direct grafting method. Unlike the direct grafting method, in the two-step method, toluene was used as the solvent for the oxime-TeNF coupling, for reasons that will be disclosed in a subsequent publication. The reaction of the oxime functionality with TeNF was much slower in toluene than in acetic acid (used to synthesize TAPA for the direct grafting to epoxy-functionalized silica). Thus, the direct grafting method was used for all subsequent syntheses.

TABLE 2

Calculation of graft molar amounts for 3-glycidyloxypropyl trimethoxysilane (epoxy), PPA and TeNF on silica(I) based on the thermogravimetric analysis data.

| Sample | % Weight loss <200° C. | % Weight loss at 890° C. | Graft amount (mmol/g) |
|---|---|---|---|
| Epoxy-silica(I) | 0.49% | 3.74% | 0.154 |
| PPA-silica(I), 12 hr | 0.50% | 4.56% | 0.061 |
| TeNF-silica(I), 46 hr | 0.69% | 4.88% | 0.003 |
| TeNF-silica(I), 94 hr | 0.87% | 5.53% | 0.014 |

Figure 5:
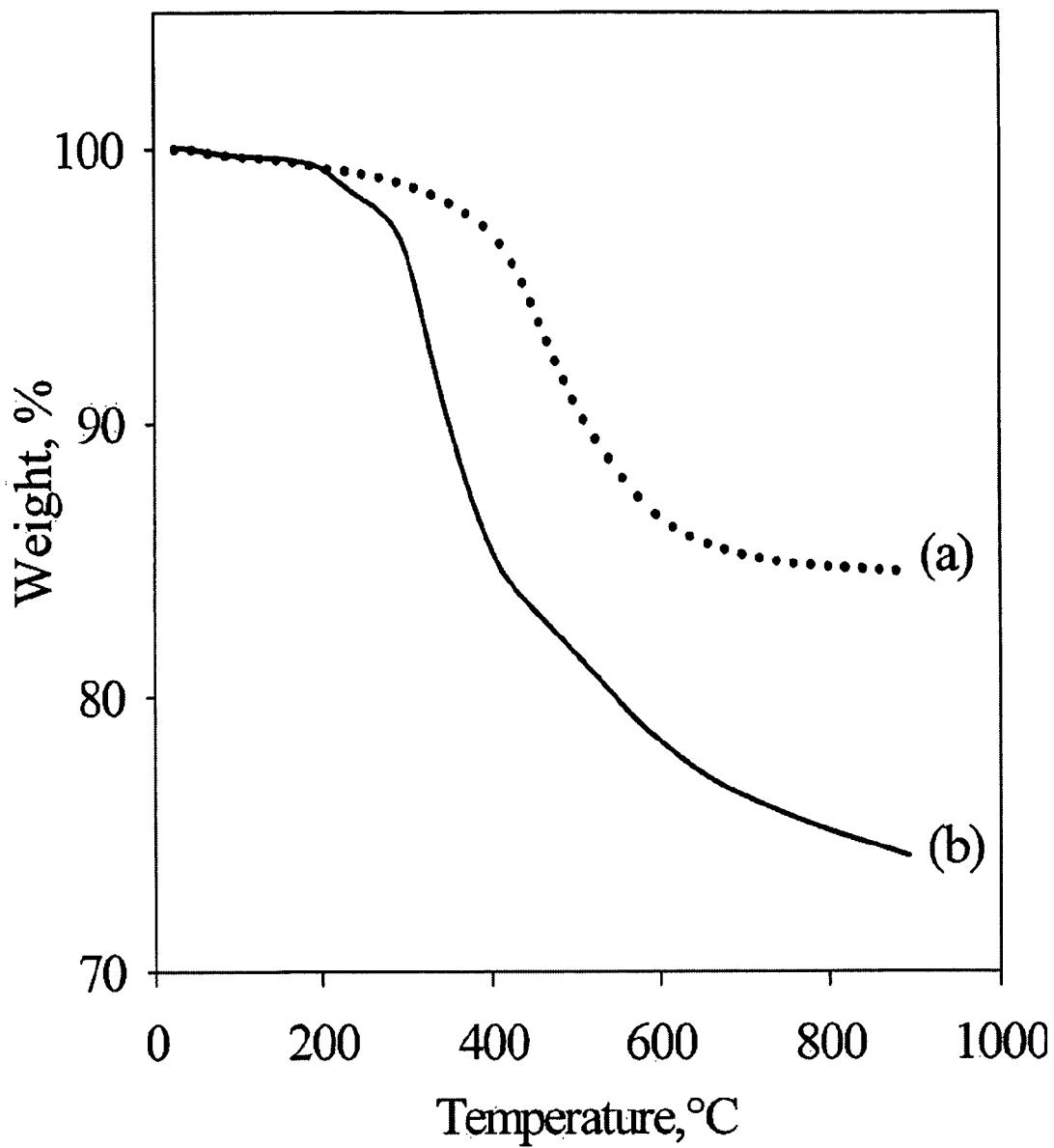
FIG. 5 depicts TGA curves for (a) epoxy-functionalized silica(II); (b) TAPA-functionalized silica(II) (reaction for 24 h).

In order to improve the loading of functional groups per unit mass of silica sorbent, testing was done with higher surface area silica. FIG. 5 shows the TGA results of the functionalized silica(II), with surface area of 480 $m^2/g$ and inner pore diameter of 60 Å, modified by the direct grafting method, and Table 3 below presents the calculated grafting densities of each functional group. By comparison, the grafting density of epoxy groups increased from 0.154 mmol/g on the silica(I) with surface area of 40 $m^2/g$ to 0.795 mmol/g on the silica(II) with surface area of 480 $m^2/g$, and the grafting density of the TAPA groups increased from 0.086 mmol/g silica to 0.391 mmol/g. The functional group density increased significantly, but not in linear proportion to the increase in surface area. A possible reason for the nonlinear increase is that for silica(II) with a smaller inner pore diameter, some of the pores were too small to allow access, of TAPA to the silanol groups.

TABLE 3

Calculation of graft molar amounts for 3-glycidyloxypropyl
trimethoxysilane (epoxy) and TAPA on silica(II)
based on the thermogravimetric analysis data.

| Sample | % Weight loss <200° C. | % Weight loss at 890° C. | Graft amount (mmol/g) |
|---|---|---|---|
| Epoxy-silica(II) | 0.65% | 15.41% | 0.795 |
| TAPA-silica(II), 24 hr | 0.68% | 25.79% | 0.391 |

The estimated molar amount of silanol groups for silica(II) is 3.984 mmol/g.

Figure 6:
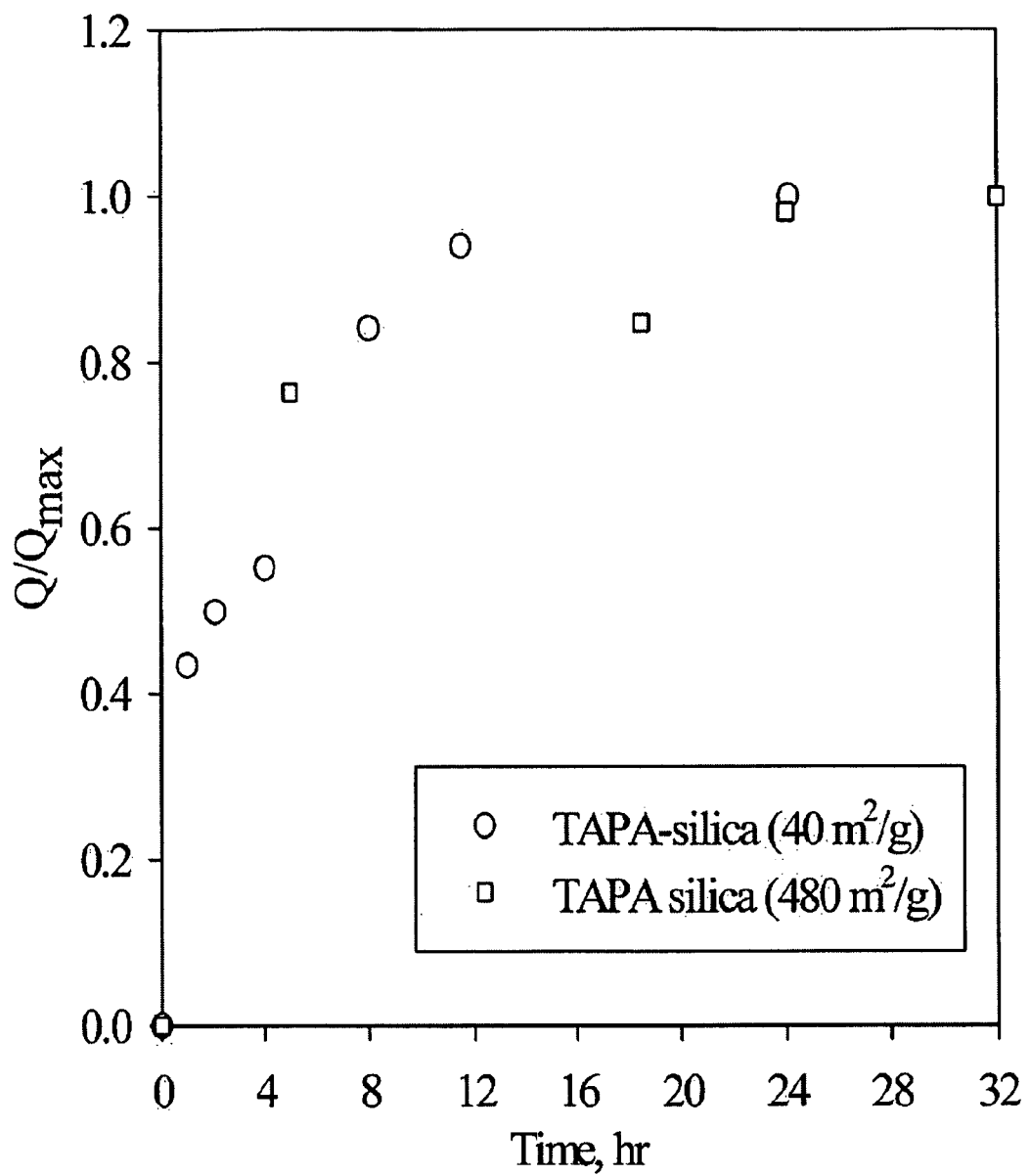
FIG. 6 depicts the adsorption kinetics for 4,6-DMDBT on TAPA-functionalized silica at 25° C. in n-heptane. (a) TAPA-functionalized silica(I); (b) TAPA-functionalized silica(II).

FIG. 6 compares the kinetics of adsorption at 25° C. of 4,6-DMDBT from n-heptane onto the TAPA-functionalized silicas. Equilibrium binding was reached in about 12 hr for the TAPA-functionalized silica(I) with larger inner pore diameter; whereas, it took about 20 to 24 hr to reach equilibrium for the TAPA-functionalized silica(II) with smaller inner pore diameter. There are three consecutive steps in the adsorption of 4,6-DMDBT from solution by porous bare silica and TAPA-functionalized silica. The first step is the transport of 4,6-DMDBT through a surface film to the exterior of the silica, followed by intraparticle pore diffusion to adsorption sites, and finally the adsorption of 4,6-DMDBT to the surface sites. In the batch adsorption experiments, the samples were put into a shaker bath operating with an agitation rate of 175 rpm, so it was expected that transport of the 4,6-DMDBT within the pores of the silica controlled the rate of uptake. The kinetics of adsorption support this idea, because a larger average inner pore diameter improved the rate of adsorption. For subsequent adsorption studies, contacting was done for 24 hr to ensure that equilibrium measurements were taken.

The Langmuir adsorption isotherm model (Equation 2) was chosen to represent the experimental data. Model parameters were determined by regression using SigmaPlot software (SPSS, Inc.).

$$Q = \frac{Q_{max}bC}{1+bC} \quad \text{(Equation 2)}$$

In this model, C is the equilibrium concentration (in mg/g) of 4,6-DMDBT in solution, Q is the adsorbed mass of 4,6-DMDBT per gram of dry silica, and b is the adsorption equilibrium constant.

Figure 7:
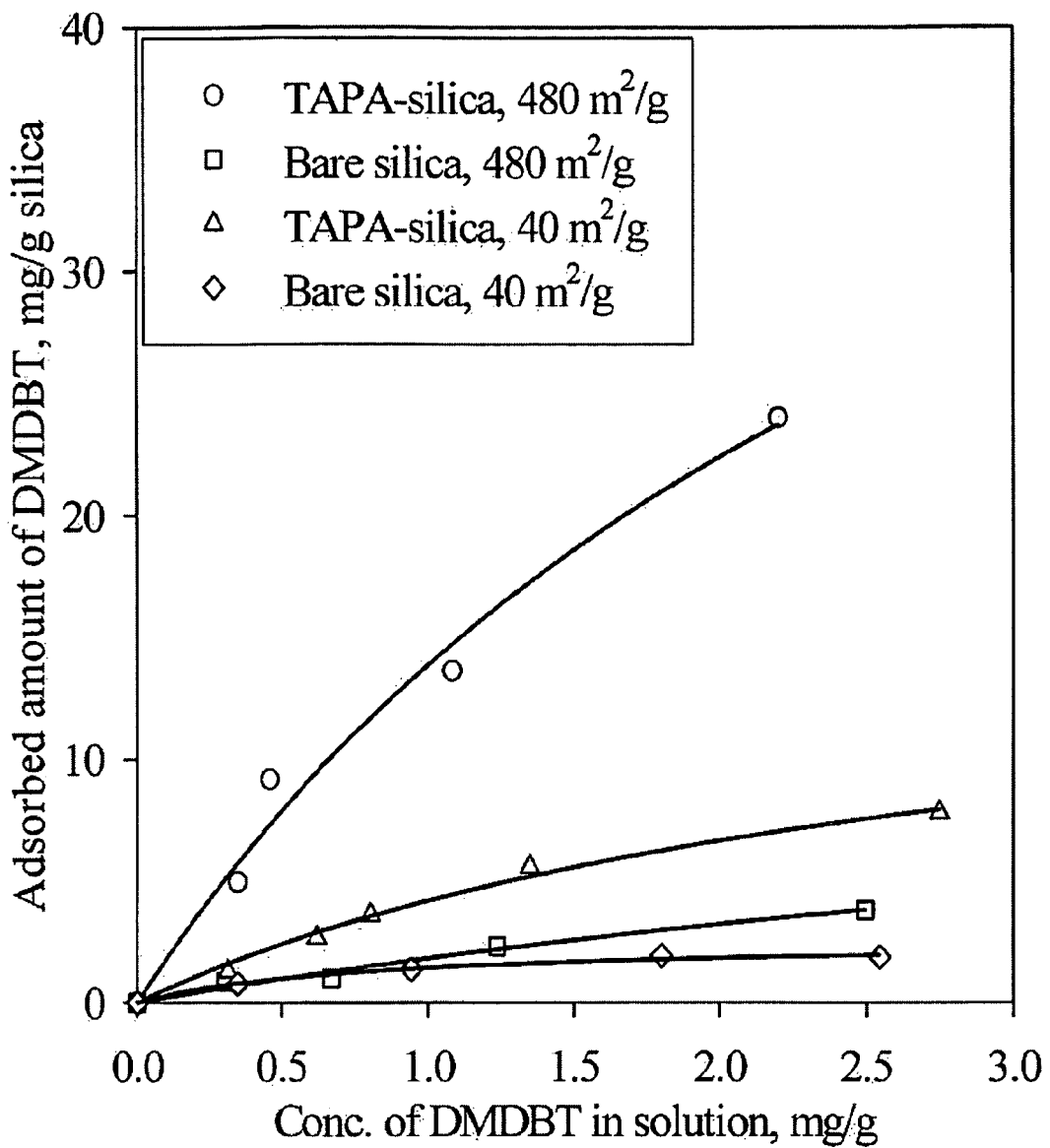
FIG. 7 depicts the adsorption isotherms of 4,6-DMDBT on TAPA-functionalized silica(I), TAPA-functionalized silica (II), bare silica(I) and bare silica(II) at 25° C. in n-heptane.

FIG. 7 compares the adsorption isotherms for 4,6-DMDBT from n-heptane onto bare silicas and TAPA-functionalized silicas. Tables 4 and 5 present the fitted parameters for these data using the Langmuir adsorption model. The results show that the 4,6-DMDBT binding capacity on silica was improved dramatically after the TAPA groups were grafted to the surface. From Table 1, the grafting density of TAPA was calculated to be about 0.086 mmol/g silica. Here, the maximum binding capacity of 4,6-DMDBT obtained by data fitting was 0.075 mmol/g silica; this result suggests that 4,6-DMDBT forms a 1:1 complex with TAPA. By comparison, the bare silica with higher surface area did not show a dramatic increase of binding capacity compared to that with lower surface area silica, and the equilibrium constants for binding were consistent. However, the maximum binding capacity of TAPA-functionalized silica for 4,6-DMDBT increased from 16.1 mg/g silica to 58.6 mg/g silica. These results demonstrate that we easily can increase the capacity for 4,6-DMDBT simply by increasing the silica surface area, and that the grafted TAPA groups provide a specific binding with 4,6-DMDBT. Symbols represent experimental data; curves represent best fits to the Langmuir adsorption model, with parameters summarized in Tables 4 and 5.

TABLE 4

Summary of Langmuir parameters for adsorption of 4,6-DMDBT on
TAPA-functionalized and bare silica(I) at 25° C. in n-heptane.

| Sample | $Q_{max}$ (mg/g) | b (g/mg) | K' ($Q_{max}$ * b) |
|---|---|---|---|
| TAPA-silica(I) | 16.1 | 0.351 | 5.65 |
| Bare silica(I) | 2.4 | 0.149 | 0.35 |

TABLE 5

Summary of Langmuir parameters for adsorption of 4,6-DMDBT on
TAPA-functionalized and bare silica(II) at 25° C. in n-heptane.

| Sample | $Q_{max}$ (mg/g) | b (g/mg) | K' ($Q_{max}$ * b) |
|---|---|---|---|
| TAPA-silica(II) | 58.6 | 0.309 | 18.12 |
| Bare silica(II) | 14.1 | 0.148 | 2.09 |

Figure 8:
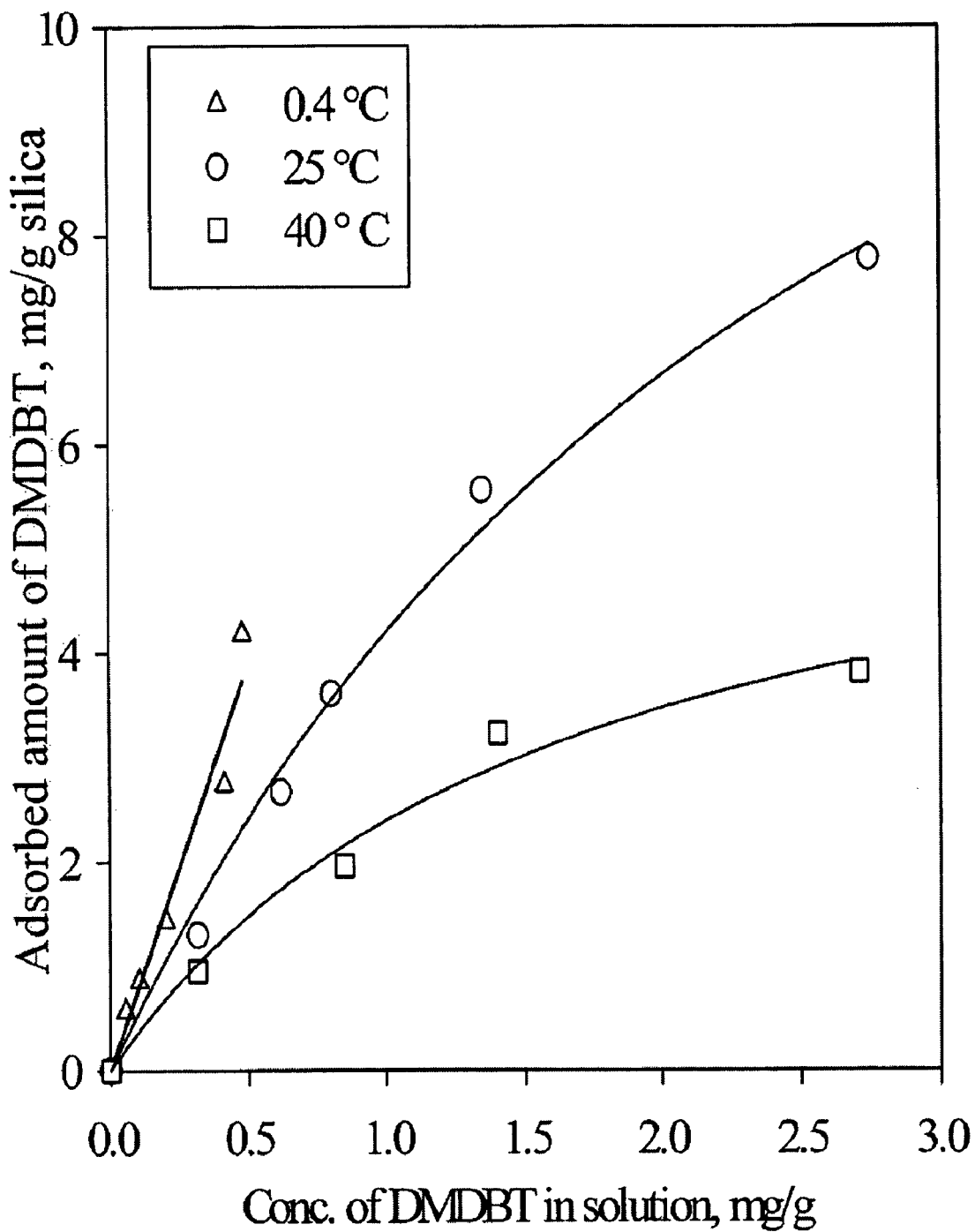
FIG. 8 depicts Adsorption isotherms for 4,6-DMDBT on TAPA-functionalized silica(I) at different temperatures in n-heptane.

FIG. 8 presents the adsorption isotherms for 4,6-DMDBT on TAPA-functionalized silica(I) from n-heptane at three different temperatures. Again, the data were fitted using the Langmuir models and Table 6 shows values for the fitted parameters, as well as the Henry's constants K' calculated as the initial isotherm slopes. Two assumptions for the Langmuir model are that adsorption sites are identical and that no lateral interactions occur between adsorbed molecules. Therefore, the model predicts that the heat of adsorption is independent of coverage. For this reason, it is proper to use data in the low concentration (Henry's law) region to extract thermodynamic adsorption data where interactions between adsorbed molecules are negligible.

TABLE 6

Summary of Langmuir parameters for adsorption of 4,6-DMDBT on
TAPA-functionalized silica(I) at three temperatures in n-heptane.

| Temperature | $Q_{max}$ (mg/g) | b (g/mg) | K' ($Q_{max}$ * b) |
|---|---|---|---|
| 40° C. | 6.3 | 0.614 | 3.87 |
| 25° C. | 16.1 | 0.351 | 5.65 |
| 0.4° C. | — | — | 7.78 |

Equation 3 gives the relationship between the Henry's constant and temperature:

$$\frac{d \ln K'}{dT} = \frac{\Delta H_{ads}}{RT^2} \quad \text{(Equation 3)}$$

Figure 9:
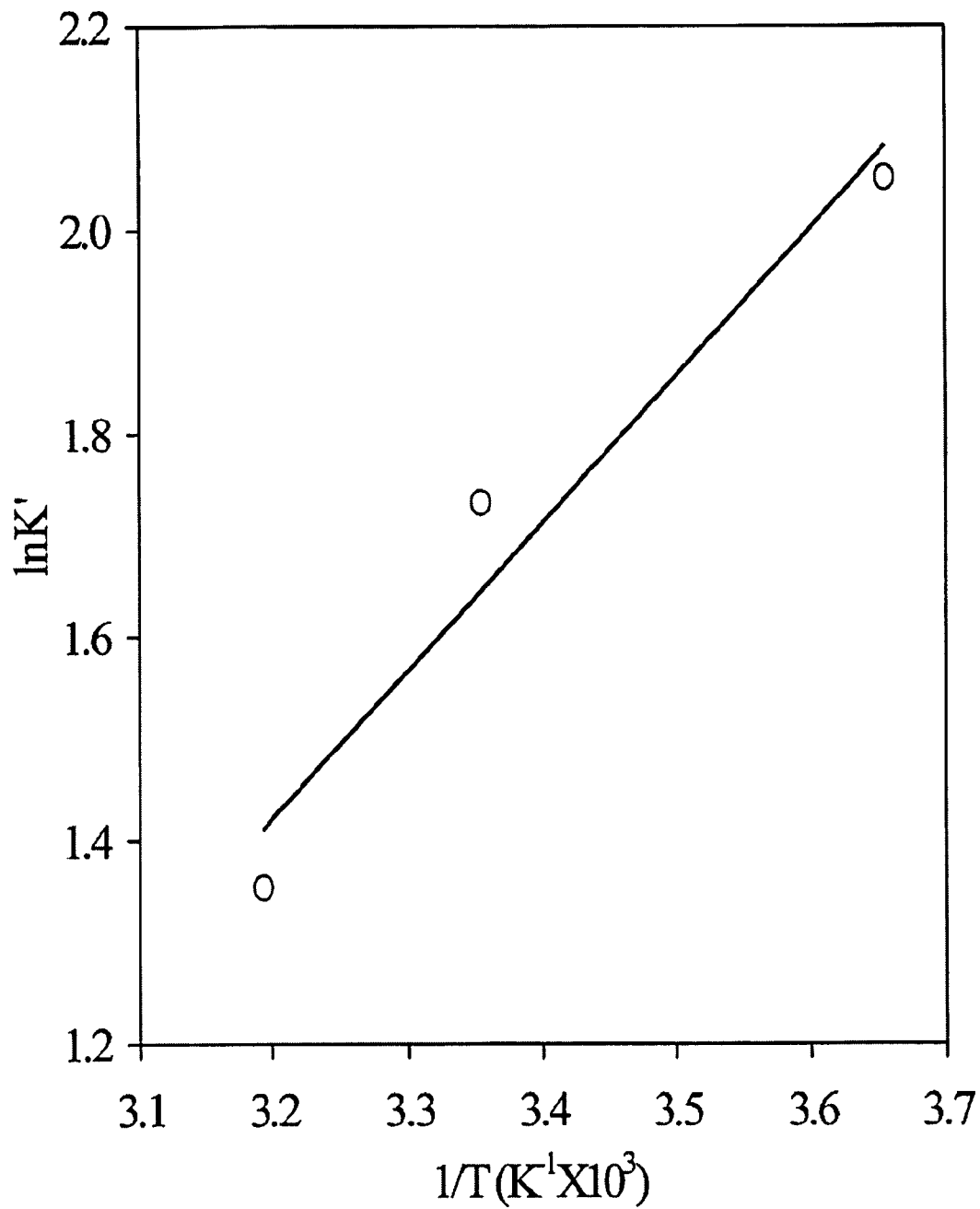
FIG. 9 depicts Henry's constant versus temperature for 4,6-DMDBT adsorption on TAPA-functionalized silica(I) in n-heptane.
Figure 10:
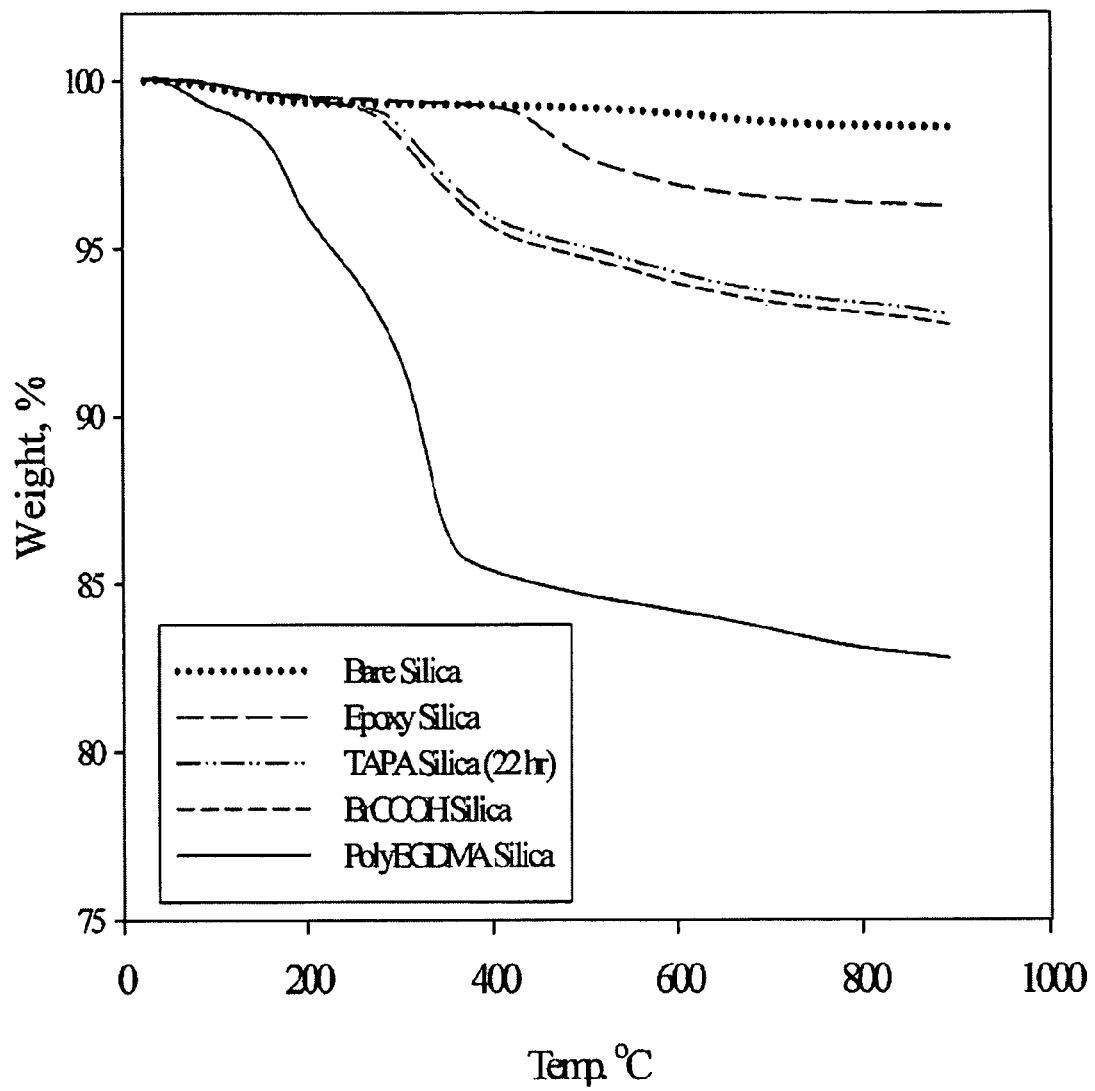
FIG. 10 depicts TGA curves for (a) bare silica; (b) epoxy-grafted silica; (c) TAPA-grafted silica (reaction 22 h); (d) Initiator-grafted silica; (e) PolyEGDMA-grafted silica.

FIG. 9 shows the data of K' versus inverse temperature. The molar enthalpy of adsorption was calculated to be $\Delta H_{ads} = -12.1$ kJ/mol, which means that complexation is strong. For comparison, enthalpies of complexation of trinitrobenzene (electron acceptor) with various aromatics (electron donors) at 20° C. in cyclohexane have been measured to be −6.15 to −18.30 kJ/mol. Stronger complexation between the π-electron acceptor and donor should translate into higher selectivity during the rebinding process; selectivity studies are under way and will be reported in the future.

CONCLUSIONS

Two methods have been demonstrated to successfully graft fluorenone-based π-acceptors onto silica gel surface. In the direct grafting method, a carboxy-oxime was added to TeNF in acetic acid to produce TAPA, which could be grafted directly to epoxy-functionalized silica. The direct grafting method is preferred to the two-step method because of a higher reaction rate and higher grafting density of fluorenone functionalities on the silica sorbent.

Two TAPA-functionalized silicas with different surface areas have been prepared successfully. Using batch adsorption testing, the silica with higher surface area was observed to have higher binding capacity for 4,6-DMDBT. Both TAPA-functionalized silica samples demonstrated dramatic improvement of capacity for binding 4,6-DMDBT when compared to the bare silica samples, and results suggest that adsorption occurs as a 1:1 interaction between 4,6-DMDBT and TAPA. From the adsorption isotherm data at different temperatures, a relationship between the Henry's constant and temperature has been developed; thus, the Henry's constant can be predicted within the range of temperature that covers the broad annual temperatures in the US. In addition, we were able to measure adsorption enthalpy for 4,6-DMDBT on TAPA-functionalized silica and show that the interaction strength is typical of a strong charge-transfer complexation.

Grafting Polymerization Initiator from TAPA-Functioned Silica (Lower, Surface Area of 40 $m^2/g$)

Scheme 1a illustrates the reaction chemistry used to add polymerization initiator groups (bromoester groups) to residual epoxy groups on the TAPA-functionalized silica. 3 g of TAPA-grafted silica was added to a solution comprising 0.3 g of 2-bromopropionic acid (BPA, 2 mmol) in 120 mL of anhydrous toluene. Next, 16 mg of TBAB (0.05 mmol) was added. The suspension was stirred and refluxed at 110° C. for 24 h. The final product was filtered, washed with 200 mL of toluene, and then dried at 80° C. overnight under vacuum at 25 mmHg.

Polymerization from Initiator-Grafted Silica (Formation of MIP—Molecular Imprinted Polymer)

The grafted bromo-initiator can be activated by atom transfer reactions with a suitable catalyst system to form radicals; a typical catalyst comprises copper salts and amine-containing organic ligands. By adjusting the molar ratio of Cu(I) to Cu(II) in the system, the reversible equilibrium between the radical and dormant species can be tuned to give a low density of growing radicals, which, along with fast initiation and negligible irreversible termination and chain transfer reactions, makes the polymerization proceed in a controllable manner. Scheme 1 shows the activation and polymerization reaction. For this study, Cu(I)Br and Cu(II)$Br_2$ were used with 1,4,8,11-tetramethyl-1,4,8,11-tetrazzacyclotetradecane ($Me_4$Cyclam) as the ligand to form the organometallic catalyst, Ethylene glycol dimethacrylate (EGDMA) was used as the monomer; acetonitrile was the solvent.

A typical reaction procedure follows to graft polymer from silica surface: Prior to polymerization, 2 g of the initiator-grafted silica was contacted for 48 hr with a 4500 ng/uL DMDBT solution in n-heptane to ensure that the silica surface was saturated with DMDBT. Then the silica was filtered and was added into a mixture comprising 7.929 g of EGDMA (40 mmol) and enough acetonitrile to make the suspension with a total volume of 40 mL. The suspension was degassed with three freeze-pump-thaw cycles to remove oxygen and was transferred into a water-free (<1 ppm) and oxygen-free (<1 ppm) glove box (Mbraun, UNIlab). By adding 0.102 g (0.4 mmol) of $Me_4$Cyclam, 22.8 mg (0.16 mmol) of Cu(I)Br and 9.0 mg (0.04 mmol) of Cu(II)$Br_2$, the polymerization was started; reactions were done in the shaker bath at 25° C. for 24 h. Following polymerization, a sample of polymerization solution was taken for GG analysis; no significant amount of DMDBT was detected. This result is important because it means that the DMDBT:TAPA complex was stable during the polymerization, which is a requirement for imprinting to occur successfully. The adsorbed DMDBT, catalyst and unreacted monomer were extracted from the MIP-silica product by Soxhlet extraction for 24 hours using toluene as the sol- Scheme 1a. Method to graft bromo-initiator from the TAPA-functionalized silica surface.

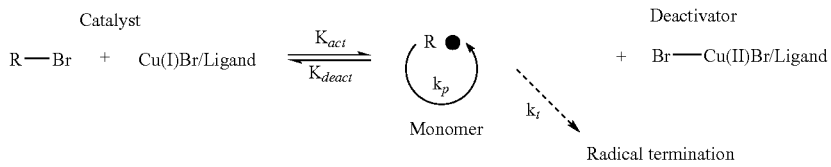

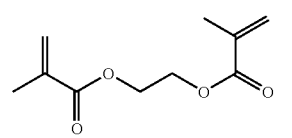

Monomer: Ethylene glycol dimethacrylate

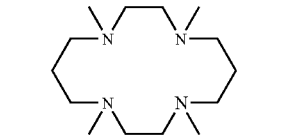

Ligand: 1,4,8,11-tetramethyl-1,4,8,11-tetraazacyclotetradecane

The illustration is meant to represent the surface after reacting epoxy groups and TAPA to the silica. The point is that we likely do not have 100% conversion of Si—OH groups to epoxy groups and that we do not have 100% conversion of epoxy groups to TAPA groups. Thus, it is possible to react 2-BPA with residual epoxy groups on the surface.

vent. Finally, the MIP-silica particles were dried under vacuum at 25 mmHg and 50° C. for 8 hr.

Table 5 summarizes these estimated grafted molar amounts or weight amounts. The reaction time for grafting TAPA functional group was 6 hr, and the grafting density for TAPA was 0.065 mmol/g silica. In order to compare the impact of TAPA grafting density on binding behavior, another sample with higher grafting density of TAPA (reaction time 22 hr) was prepared. FIG. 11 shows the TGA scans for this second sample following each modification step, and Table 6 presents the estimated grafted molar amounts for this sample. By comparison, a higher BPA grafting density was observed for the silica surface with a lower grafting density of TAPA. This result makes sense because there are more reactive epoxy groups available for reaction on the silica that has a lower number of TAPA groups. An interesting finding is that more polymer was grafted successfully from the surface with a lower initiator density, possibly due to the close proximity of the growing polymer chains led to higher degrees of chain termination for the sample with higher initiator density.

What is claimed is:

1. A process for producing an adsorbent comprising:
   (A) providing an epoxy-functionalized metal oxide;
   (B) providing 2,4,5,7-tetranitro-9-fluorenylideneaminooxy propionic acid (TAPA);
   (C) reacting the epoxy-functionalized metal oxide with 2,4,5,7-tetranitro-9-fluorenylideneaminooxy propionic acid (TAPA), producing the adsorbent;
   wherein the adsorbent upon contact with a hydrocarbon mixture comprising at least one sulfur containing compound forms a charge transfer complex with the one sulfur containing compound to remove the at least one sulfur containing compound from the hydrocarbon mixture.

2. The process of claim 1, wherein said 2,4,5,7-tetranitro-9-fluorenylideneaminooxy propionic acid (TAPA) is provided by reacting an amino-substituted propionic acid with a nitro-substituted fluorenone.

3. The process of claim 2, wherein the epoxy-functionalized metal oxide is produced by reacting a metal oxide with an alkoxy silane.

4. The process of claim 3, wherein said metal oxide is selected from the group consisting of silica, alumina and zeolites.

5. The process of claim 3, wherein said alkoxysilane comprises 3-glycidyloxypropyl trimethoxysilane.

6. The process of claim 1 wherein the metal oxide comprises silica.

7. The process of claim 2, wherein said nitro-substituted fluorenone comprises 2,4,5,7-tetranitrofluorenone.

8. The process of claim 2, wherein said amino-substituted propionic acid comprises 2-(isopropylideneaminooxy)propionic acid.

9. The process of claim 1, wherein the at least one sulfur-containing compound removed from the hydrocarbon mixture is selected from the group consisting of thiophene, benzothiophene, dibenzothiophene and their alkyl derivatives.

10. The process of claim 9, wherein said at least one sulfur-containing compound comprises 4,6-dimethyldibenzothiophene.

11. A process for producing an adsorbent comprising:
    (A) reacting a metal oxide with an alkoxy silane to produce an epoxy-functionalized metal oxide wherein the conversion to epoxy groups is less than 100% resulting in residual Si—OH groups on the surface of the metal oxide;
    (B) reacting the epoxy-functionalized metal oxide having residual expoxy groups on the surface with an amino-substituted propionic acid wherein the conversion rate is less than 100% resulting in residual epoxy groups on the surface of the product;
    (C) reacting the product of step (B) with a bromo-substituted propionic acid wherein bromo-substituted propionic acid reacts with in the residual groups; and
    (D) graft polymerizing ethylene glycol dimethacrylate onto the product of step (C),
    wherein the adsorbent produced by the process, upon contact with a hydrocarbon mixture comprising at least one sulfur containing compound forms a charge transfer complex with the one sulfur containing compound to remove the at least one sulfur containing compound from the hydrocarbon mixture.

12. The process of claim 11, wherein the amino-substituted propionic acid comprises 2,4,5,7-tetranitro-9-fluorenylideneaminooxy propionic acid (TAPA).

13. The process of claim 11, wherein said metal oxide is selected from the group consisting of silica, alumina and zeolites.

14. The process of claim 11, wherein said metal oxide comprises silica.

15. The process of claim 11, wherein said alkoxysilane comprises 3-glycidyloxypropyl trimethoxysilane.

16. The process of claim 12, wherein 2,4,5,7-tetranitro-9-fluorenylideneaminooxy propionic acid (TAPA) is provided by reacting an amino-substituted propionic acid with a nitro-substituted fluorenone.

17. The process of claim 16, wherein said nitro-substituted fluorenone comprises 2,4,5,7-tetranitrofluorenone.

18. The process of claim 16, wherein said amino-substituted propionic acid comprises 2-(isopropylideneaminooxy) propionic acid.

19. The process of claim 11, wherein said bromo-substituted propionic acid comprises 2-bromopropionic acid (2-BPA).

20. The process of claim 11, wherein said at least one sulfur-containing compound is selected from the group consisting of thiophene, benzothiophene, dibenzothiophene and their alkyl derivatives.

21. The process of claim 20, wherein said at least one sulfur-containing compound comprises 4,6-dimethyldibenzothiophene.

* * * * *